United States Patent
Bragg et al.

(10) Patent No.: US 7,532,782 B2
(45) Date of Patent: May 12, 2009

(54) FLEXIBLE OPTICAL CIRCUIT APPARATUS AND METHOD

(75) Inventors: William David Bragg, Plano, TX (US); Peter Earl Stokes, Indian Harbour Beach, FL (US); John W. Ayres, III, Forney, TX (US)

(73) Assignee: Pivotal Decisions LLC, Las Vegas, NV (US)

( * ) Notice: Subject to any disclaimer, the term of this patent is extended or adjusted under 35 U.S.C. 154(b) by 0 days.

(21) Appl. No.: 10/323,126

(22) Filed: Dec. 18, 2002

(65) Prior Publication Data

US 2003/0198427 A1    Oct. 23, 2003

Related U.S. Application Data

(60) Provisional application No. 60/373,693, filed on Apr. 18, 2002.

(51) Int. Cl.
G02B 6/12 (2006.01)
G02B 6/26 (2006.01)
G02B 6/42 (2006.01)
G02B 6/10 (2006.01)

(52) U.S. Cl. ............... 385/14; 385/31; 385/32; 385/39; 385/49; 385/129

(58) Field of Classification Search .......... 385/12–15, 385/88–89, 129–132, 92, 137, 49–52, 25, 385/27, 31–39, 95–99; 156/179, 230, 176; 438/27
See application file for complete search history.

(56) References Cited

U.S. PATENT DOCUMENTS

| 4,981,336 | A | * | 1/1991 | Mohan ..................... 385/56 |
| 4,988,157 | A |   | 1/1991 | Jackel et al. |
| 5,204,925 | A | * | 4/1993 | Bonanni et al. ............. 385/89 |
| 5,249,245 | A | * | 9/1993 | Lebby et al. ............... 385/89 |
| 5,259,051 | A | * | 11/1993 | Burack et al. .............. 385/76 |
| 5,292,390 | A | * | 3/1994 | Burack et al. ............. 156/176 |
| 5,425,831 | A | * | 6/1995 | Grimes et al. ............. 156/179 |
| 5,432,630 | A |   | 7/1995 | Lebby et al. |
| 5,539,848 | A | * | 7/1996 | Galloway ................... 385/89 |

(Continued)

Primary Examiner—Frank G Font
Assistant Examiner—Ryan Lepisto
(74) Attorney, Agent, or Firm—Woodcock Washburn LLP

(57) ABSTRACT

A flexible optical circuit comprising passive or active components is provided. The flexible optical circuit includes a first optical fiber having both first and second ends, a second optical fiber having both first and second ends, a flexible substrate attached to both the first and second optical fibers where the first and second pins of the first and second optical fibers extend to at least the edge of the flexible substrate and a component coupled to the first optical fiber between the first and second ends. The component can be used passive or active. A passive component requires no electrical trace lines to activate the component and the passive component will react upon the reception of a light-wave signal. The active component will require power from the back plane before the active component can modify or affect the light-wave signal. The first and second ends of the optical fibers extend at least to the edge of the flexible optical circuit or can extend beyond the edge of the flexible substrate. The flexible optical fibers can be fixedly attached to the flexible substrate through an adhesive or the flexible optical fibers can be intermittently fixedly attached to the flexible substrate.

46 Claims, 4 Drawing Sheets

U.S. PATENT DOCUMENTS

| | | | |
|---|---|---|---|
| 5,625,734 A * | 4/1997 | Thomas et al. ................. | 385/88 |
| 5,668,909 A * | 9/1997 | Mozzati ....................... | 385/134 |
| 5,768,456 A * | 6/1998 | Knapp et al. ................... | 385/49 |
| 5,790,733 A * | 8/1998 | Smith et al. .................... | 385/88 |
| 5,835,646 A * | 11/1998 | Yoshimura et al. ............ | 385/14 |
| 5,902,435 A * | 5/1999 | Meis et al. ................. | 156/230 |
| 5,903,687 A | 5/1999 | Young et al. | |
| 5,937,133 A * | 8/1999 | Moss et al. ................. | 385/137 |
| 5,943,455 A * | 8/1999 | Travieso et al. ............... | 385/24 |
| 6,005,991 A * | 12/1999 | Knasel ........................ | 385/14 |
| 6,049,641 A | 4/2000 | Deacon et al. | |
| 6,091,867 A | 7/2000 | Young et al. | |
| 6,160,928 A | 12/2000 | Schroeder | |
| 6,198,856 B1 | 3/2001 | Schroeder et al. | |
| 6,203,212 B1 * | 3/2001 | Rosenberg et al. ............ | 385/92 |
| 6,233,376 B1 | 5/2001 | Updegrove | |
| 6,242,274 B1 * | 6/2001 | Nyholm ....................... | 438/27 |
| 6,343,171 B1 * | 1/2002 | Yoshimura et al. ............ | 385/50 |
| 6,655,854 B1 * | 12/2003 | Nguyen et al. ................. | 385/88 |
| 6,688,776 B2 * | 2/2004 | Simmons et al. ............... | 385/53 |
| 2003/0081925 A1 * | 5/2003 | Albert ........................ | 385/137 |
| 2003/0117691 A1 * | 6/2003 | Bi et al. ....................... | 359/333 |
| 2003/0194187 A1 * | 10/2003 | Simmons et al. ............... | 385/53 |
| 2004/0264882 A1 * | 12/2004 | Torigoe et al. ................. | 385/88 |

* cited by examiner

FLEXIBLE OPTICAL CIRCUIT APPARATUS AND METHOD

CROSS-REFERENCE TO RELATED CASES

This application claims priority under 35 U.S.C. § 119(e) from U.S. Provisional Application Ser. No. 60/373,693 filed on Apr. 18, 2002 entitled "Flexible Optical Circuit Apparatus and Method," which is herein incorporated by reference in its entirety.

FIELD OF THE INVENTION

This invention relates to a flexible optical circuit including active and passive elements.

BACKGROUND OF THE INVENTION

The transmission, routing and dissemination of information has occurred over computer networks for many years via standard electronic communication lines. These communication lines are effective, but place limits on the amount of information being transmitted and the speed of the transmission. With the advent of light-wave technology, a large amount of information is capable of being transmitted, routed and disseminated across great distances at a high transmission rate over fiber optic communication lines. These fiber optic systems are most efficient when information is transferred from an end-point to another end-point. When the information must be routed from an end-point to a secondary point, expensive and highly advanced technological apparatus is necessary to accomplish this task. Physically large and expensive routing circuits must be manufactured and implemented to perform these routing functions. To ease this technical limitation, optical flexible circuits have been developed which allow for greater flexibility and ease in developing and maintaining circuits which disseminate information from a single end-point to various secondary end-points. One example of an optical flex circuit is Molex's FlexPlane™. The FlexPlane™ is used to interconnect systems using fiber optic technology. The FlexPlane™ uses a flame-resistant substrate which is attached to multiple fibers which then can connect to the incoming fiber optic lines and connect to the multiple fiber optic lines which are attached to the secondary end-points.

Typical optical flex circuits allow for the fiber optic lines to be "sandwiched" between laminates and adhesives to form a flexible circuit. An example of such a flexible optical circuit is shown in U.S. Pat. No. 6,005,991 issued to Knasel. In Knasel, the flexible optical circuit includes a pair of partially flexible sheets and a number of optical fibers disposed between the partially flexible sheets such that the first and second ends of the optical fibers extend outwardly beyond the pair of partially flexible sheets. The pair of partially flexible sheets are adhesively connected around the optical fibers forming the flexible optical circuit. The FlexPlane™ and the flexible optical circuit disclosed in Knasel allow for the use of passive and active components outside of the flexible optical circuit. However, neither of these systems provide a flexible optical circuit which includes passive or active components.

The passive or active components allow for the light-wave signal to be modified or enhanced during its transmission, routing and dissemination. Therefore, a need exists in a light-wave transmission industry for a flexible optical circuit which allows for the incorporation of passive or active components within the flexible optical circuit.

SUMMARY OF THE INVENTION

A flexible optical circuit comprising passive or active components is provided. The flexible optical circuit includes a first optical fiber having both first and second ends, a second optical fiber having both first and second ends, a flexible substrate attached to both the first and second optical fibers where the first and second ends of the first and second optical fibers extend to at least the edge of the flexible substrate and a component coupled to the first optical fiber between the first and second ends. The component can be either passive or active. A passive component requires no power to activate the component; the passive component will react upon the reception of a light-wave signal. The active component requires power from the back plane before the active component can modify or affect the light-wave signal. The first and second ends of the optical fibers extend at least to the edge of the flexible optical circuit or can extend beyond the edge of the flexible substrate. The flexible optical fibers can be fixedly attached to the flexible substrate through an adhesive or the flexible optical fibers can be intermittently fixedly attached to the flexible substrate.

DETAILED DESCRIPTION OF THE DRAWINGS

A better understanding of the invention can be obtained from the following detailed description of one exemplary embodiment as considered in conjunction with the following drawings in which.

DETAILED DESCRIPTION OF EXEMPLARY EMBODIMENTS

Figure 1A:
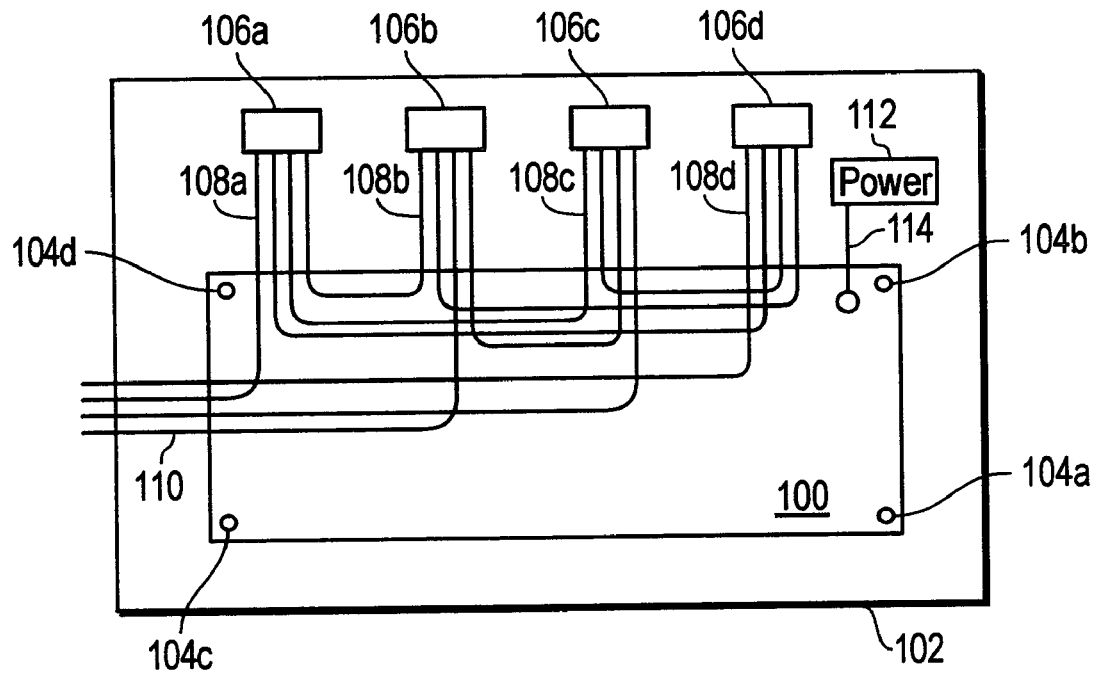
FIG. 1a is a block diagram of a back plane of a computer system according to the present invention.

In the descriptions which follow, like parts are marked throughout the specification and drawings with the same numerals, respectively. The drawing figures are not necessarily drawn to scale and certain figures may be shown in exaggerated or generalized form in the interest of clarity and conciseness.

Figure 1B:
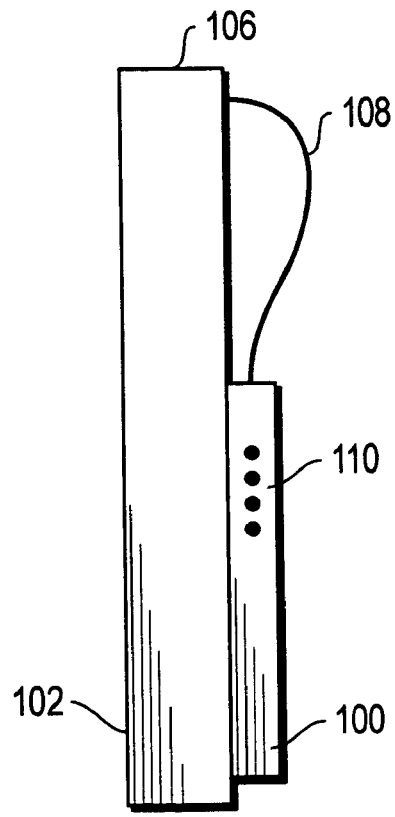
FIG. 1b is a side view of the back plane of a computer system according to the present invention.

FIGS. 1a and 1b illustrate block diagrams of a computer system including a flexible optical circuit according to the present invention. A flexible optical circuit 100 is shown mounted to a back plane 102 through mounting holes 104a-104d. The flexible optical circuit 100 is connected to ferrals 106a-106d by optical fibers 108a-108d, respectively. The flexible optical circuit 100 can also be connected to an optic device through fiber optic lines 110. In this embodiment, only four ferrals 106 are shown connected to the flexible optical circuit 100. However, any number of ferrals can be implemented without detracting from the spirit of the invention. In this embodiment, the optical fibers 108a-108d extending from ferrals 106a-106d and the optical fibers 110 are interconnected via the flexible optical circuit 100 and allow light-wave signals to enter and exit through the backplane. A power device 112 is also shown attached to the back plane 102. The power device allows for a voltage to be transmitted across a power trace 114 to the flexible optical circuit. If an active component, as discussed herein, were embedded within the flexible optical circuit 100, then the power traces embedded within the flexible optical circuit 100 would be attached to the power trace 114 connecting the active component with the power device 112.

The flexible optical circuit 100 according to the present invention is prepared by first creating a flexible substrate. An adhesive is then applied to the flexible substrate. Next, the optical fibers are placed upon the flexible substrate according to a predetermined master plan. Thus, using the flexible optical circuit 100 as shown in FIGS. 1*a* and 1*b*, the master plan would dictate that the second optical fiber of 108*a* would need to be attached to the second optical fiber of 108*d*. The master plan provides for the location and termination of each fiber to be included within the flexible optical circuit 100. During manufacture, excess optical fiber is provided at the ends of the flexible optical circuit 100 and arranged in a "pigtail" formation. The excess optical fiber allows for multiple attempts at connecting the flexible optical circuit 100 to the fiber optic lines 108*a*. Multiple attempts may be necessary before a proper connection is made.

In another embodiment, the flexible optical circuit 100, including components, can be flexed prior to mounting or can be flexed without mounting. The flexible optical circuit 100 is manufactured so that the flexible optical circuit 100 can be flexed to accommodate a variety of shapes of enclosures.

Figure 2:
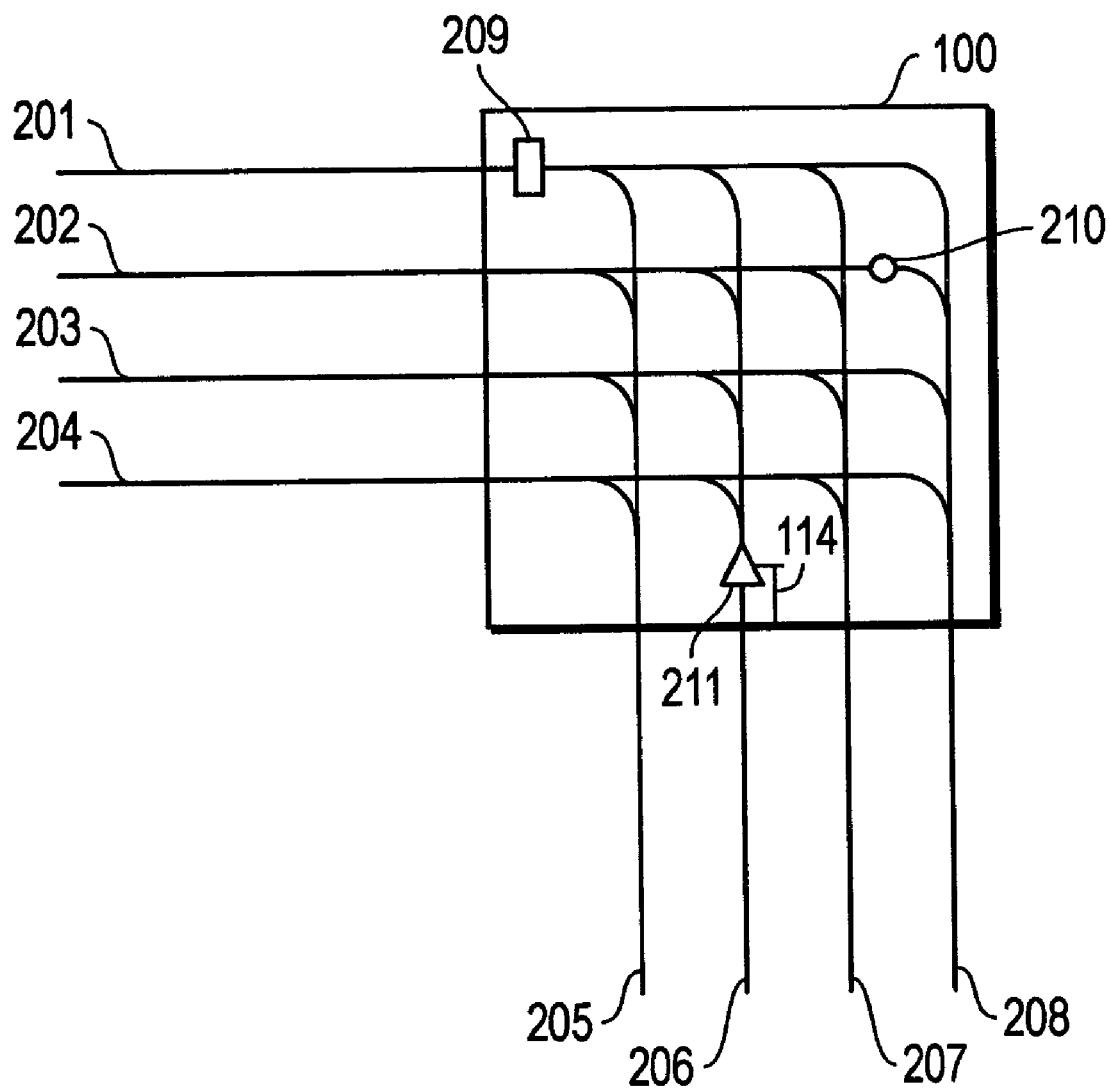
FIG. 2 is a block diagram depicting a flexible optical circuit including passive and active components.

Referring now to FIG. 2, a flexible optical circuit including active and passive components is shown according to the present invention. The flexible optical circuit 100 is shown including fiber optic lines 201, 202, 203 and 204 on one edge of the flexible optical circuit 100 and with fiber optic lines 205, 206, 207 and 208 on a second edge of the flexible optical circuit 100. Embedded within the flexible optical circuit 100 are passive component 209 and 210 and an active component 211. The distribution of the fiber optic lines of the flexible optical circuit 100 as shown in FIG. 2 is illustrative and multiple fiber optic line routing schemes can be implemented without detracting from the spirit of the invention. Passive component 209 is embedded within the flexible optical circuit 100 and connects fiber optic line 201 with fiber optic lines 205, 206, 207 and 208. Therefore, any light-wave signal traveling to or from fiber optic line 201 is affected by passive component 209. Passive component 210 is connected to fiber optic line 202 and fiber optic line 208. Thus, any light-wave transmission through fiber optic line 202 destined for fiber optic line 208 or any light-wave transmission from fiber optic line 208 destined to fiber optic line 202 is affected of modified by passive component 210. The passive components 209 and 210 include filters, circulators and isolators. However, multiple other passive components can be implemented within the flexible optical circuit without detracting from the spirit of the invention.

Active component 211 is shown attached to fiber optic line 206 and fiber optic lines 201, 202, 203 and 204. The active component 211 is also attached to the power traces 114. Active component 211 includes filters, switches, amplifiers and attenuators. However, many other active components may be implemented with the flexible optical circuit 100 without detracting from the spirit of the invention.

Passive components 209 and 210 and active component 211 can be embedded within the flexible substrate and attached with the adhesive to the flexible optical circuit 100. The passive components 209 and 210 can attach directly to the flexible substrate or the flexible substrate can include an opening or casing which receives the passive components 209 and 210. Alternatively, the active component 211 may be placed within an opening of the flexible optical substrate. Thus, if the position of the active component is known during the manufacture of the flexible optical circuit 100, then an opening in the flexible optical substrate may be prepared so that the active component 211 is placed within this opening. By placing the active component 211 in the opening, potential difficulties in maintaining the proper bend radius of the fiber optic lines can be avoided. By allowing the active component to protrude through either side of the flexible optical circuit 100, the optical fibers remain in the same plane. This embodiment also has the advantage that the active component 211 can be physically mounted to the back plane 102 and thus avoid any strain placed upon the optical fibers by the weight of the active component 211. Further, by mounting the active component 211 to the back plane 102, the back plane 102 acts as a heat sink for the active component 211.

In another embodiment, an intermediate flexible substrate may be placed over the components and optical fibers. In this embodiment, the electrical traces 114 which attach the power of the back plane 102 to the active components 211 are placed on a separate plane of the optical flex circuit 100 and do not directly contact the optical fibers. The only direct connection between the power trace 114 plane and the optical fiber plane is when the power traces 114 connect to the active component 211.

In another embodiment, the electrical traces 114 can come into direct contact with the optical fibers and a laminate be provided over the flexible substrate sandwiching the optical fibers and electrical traces within the flexible substrate and the laminate.

In another embodiment, the active component 211 can be attached to the flexible substrate through the use of an adhesive tape. In another embodiment, the active component 211 includes protrusion which attach to the flexible substrate and allow the active component 211 to remain within the opening of the flexible substrate.

Figure 3A:
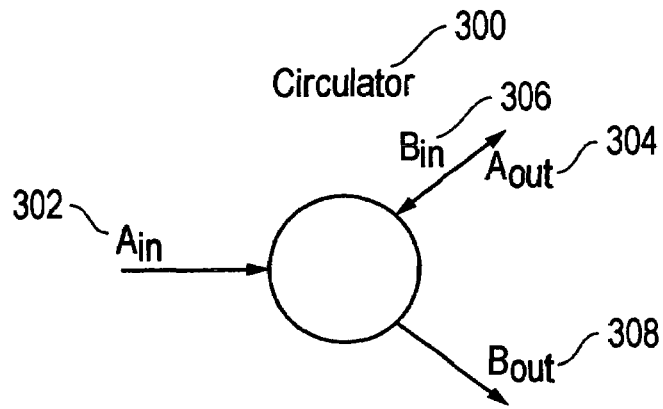
FIG. 3a is a block diagram of a circulator.
Figure 3B:
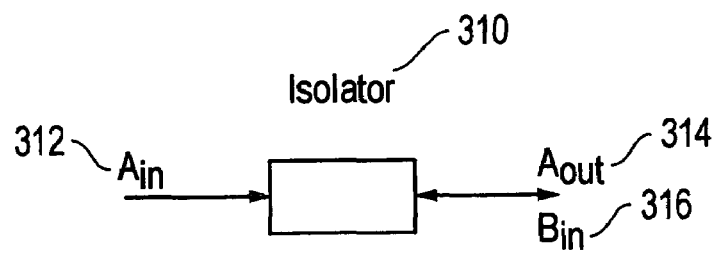
FIG. 3b is a block diagram of an isolator.
Figure 3C:
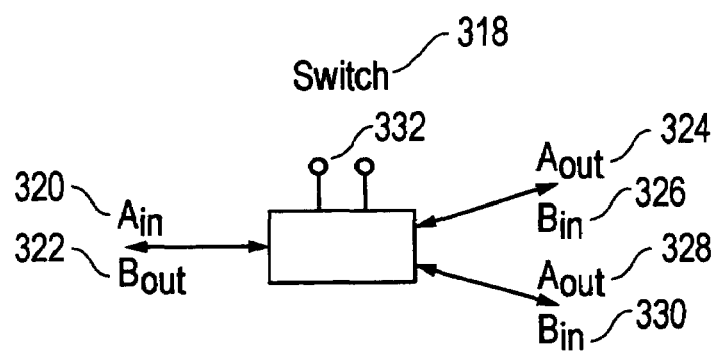
FIG. 3c is a block diagram of switch.

FIGS. 3*a* through 3*c* illustrate various passive and active components for use in the present invention. A circulator 300 is shown attached to three fiber optic lines. A light-wave signal is received by the circulator 300 through fiber optic line $A_{in}$ 302. A light-wave transmission is also received by circulator 300 through fiber optic line $B_{in}$ 306. The circulator 300 routes the light-wave signals according to a predetermined routing scheme. Thus, the light-wave signal received in $A_{in}$ 302 is transmitted out $A_{out}$ 304 and the light-wave signal received from $B_{in}$ 306 is transmitted out $B_{out}$ 308. Thus, the circulator 300 can receive two light-wave signals and transmit out the same two light-wave signals over three different optical fibers.

FIG. 3*b* illustrates an isolator. An isolator 310 is shown. The isolator 310 functions as an optical diode. A light-wave signal is received on fiber optic line $A_{in}$ 312 and transmitted out $A_{out}$ 314. However, a light-wave signal received on optical fiber $B_{in}$ 316 is not passed through the isolator 310. Thus, the isolator 310 is used to make certain optical fibers unidirectional instead of bidirectional.

An active switch is shown in FIG. 3*c*. The active switch 318 includes power traces 332 and allows for a light-wave signal to be received by the switch on $A_{in}$ 320. According to the programming of the active switch 318, the light-wave signal is transmitted out $A_{out}$ 324 or $A_{out}$ 328. Also, a light-wave signal from either $B_{in}$ 326 or $B_{in}$ 330 is received by the active switch 318 and is transmitted out $B_{out}$ 322. Further, the active switch 318 can allow only one of the light-wave signals $B_{in}$ 326 or $B_{in}$ 330 to be transmitted out of the active switch 318.

Figure 4:
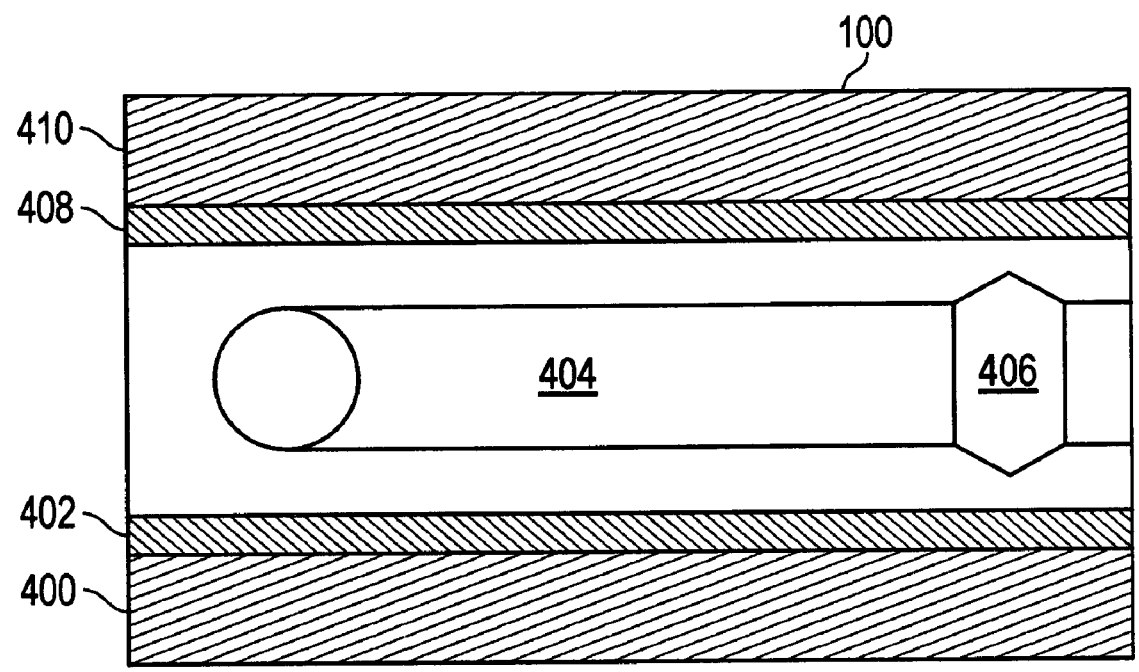
FIG. 4 is a block diagram of the side view of the flexible optical circuit according to the present invention.

FIG. 4 illustrates a side view of a fabricated flexible optical circuit 100. The flexible optical circuit 100 includes a flexible substrate 400 placed on the bottom. Next, an adhesive 402 is placed upon the flexible substrate 400. The adhesive 402 can be placed uniformly across the entire surface of the flexible substrate, placed intermittently across the flexible substrate or the adhesive 402 can be placed only around the outer edges of the flexible substrate 400. Next, the optical fibers 404 are laid upon the adhesive 402 and flexible substrate 400. The optical fibers 404 are positioned according to a predetermined master plan and allow the optical fibers 404 to make specific connections. Components 406 are then attached to optical fibers 404 and placed on the adhesive 402 and flexible substrate 400. Alternatively, the components 406 are connected to the specific optical fibers 404 prior to the optical fibers 404 placement on the adhesive 402. A second layer of adhesive 408 can then by applied to optical fibers 404 and components 406. The second coat of adhesive 408 can also be applied throughout, intermittently or solely around the edges of the flexible optical circuit 100. Finally, a laminate 410 is then placed on top of the second layer of adhesive 408. One advantage of the flexible optical circuit 100 is a hard-wired circuit requires more optical fibers and requires a larger enclosure. The flexible optical circuit 100 with passive and active components requires less materials, space, and costs less to prepare.

In anther embodiment, the second coat of adhesive 408 and the second laminate 410 can be omitted from the preparation of flexible optical circuit without detracting from the spirit of the invention. The flexible substrate and flexible laminate 400 and 410 respectively can be prepared from Mylar, Kapton, a shrink-wrap material or any other flexible sheet of material without detracting from the spirit of the invention. The adhesive 402 and 408 are known to those skilled in the art.

The foregoing disclosure and description of the invention are illustrative and explanatory thereof of various changes to the size, shape, materials, components and order may be made without departing from the spirit of the invention.

The invention claimed is:

1. A flexible optical circuit comprising:
   a first optical fiber having a first end;
   a second optical fiber having a second end;
   a third optical fiber having a third end;
   a fourth optical fiber having a fourth end;
   a first flexible substrate comprising a first edge and a second edge, wherein the first end of the first optical fiber and the third end of the third optical fiber each extend at least to the first edge of the first flexible substrate, and wherein the second end of the second optical fiber and the fourth end of the fourth optical fiber each extend at least to the second edge of the first flexible substrate; and
   a first component coupled to the first and second optical fibers between the first and second ends,
   wherein the first component is configured to affect an optical signal propagating on the first and second optical fibers.

2. The flexible optical circuit of claim 1 further comprising a first connector coupled to the first end of the first optical fiber and a second connector coupled to the second end of the second optical fiber.

3. The flexible optical circuit of claim 1 further comprising a second component coupled to the third and fourth optical fibers between the third and fourth ends.

4. The flexible optical circuit of claim 1, wherein the first flexible substrate is fixedly attached to the first and second optical fibers.

5. The flexible optical circuit of claim 1, wherein the first flexible substrate is fixedly attached to the first and second optical fibers with an adhesive.

6. The flexible optical circuit of claim 1, wherein the first flexible substrate is intermittently attached to the first and second optical fibers.

7. The flexible optical circuit of claim 1 further comprising a second flexible substrate attached to the first flexible substrate.

8. The flexible optical circuit of claim 7, wherein the first and second optical fibers attach around at least a portion of a periphery of the first and second flexible substrates.

9. The flexible optical circuit of claim 1 further comprising a back plane attached to the first flexible substrate.

10. The flexible optical circuit of claim 9, wherein the first flexible substrate is mounted to the back plane.

11. The flexible optical circuit of claim 1, wherein the first component comprises a passive component.

12. The flexible optical circuit of claim 11, wherein the passive component is selected from the group consisting of a filter, a circulator, and an isolator.

13. The flexible optical circuit of claim 1, wherein the first component comprises an active component.

14. The flexible optical circuit of claim 13, wherein the active component is positioned in an opening in the first flexible substrate.

15. The flexible optical circuit of claim 13 further comprising an electrical trace having a fifth end and a sixth end, wherein the fifth end is coupled to the active component, and wherein the sixth end extends to at least the first edge of the first flexible substrate.

16. The flexible optical circuit of claim 15, wherein the electrical trace overlaps at least a portion of the first optical fiber.

17. The flexible optical circuit of claim 15 further comprising an intermediate flexible substrate disposed between the electrical trace and at least a portion of the first optical fiber.

18. The flexible optical circuit of claim 13, wherein the active component is selected from the group consisting of a filter, a switch, an amplifier, and an attenuator.

19. The flexible optical circuit of claim 1, wherein the first end of the first optical fiber extends beyond the first edge of the first flexible substrate.

20. The flexible optical circuit of claim 1, wherein the second end of the second optical fiber extends beyond the second edge of the first flexible substrate.

21. The flexible optical circuit of claim 1, wherein the first flexible substrate is fixedly attached to the second optical fiber.

22. The flexible optical circuit of claim 1, wherein the first flexible substrate is fixedly attached to the second optical fiber with an adhesive.

23. The flexible optical circuit of claim 1, wherein the first flexible substrate is intermittently attached to the second optical fiber.

24. The flexible optical circuit of claim 1, wherein the first optical fiber attaches around a periphery of the first flexible substrate and a second flexible substrate.

25. A method of preparing a flexible optical circuit, the method comprising:
   applying a first layer of adhesive to a flexible substrate having a first edge and a second edge;
   positioning an optical fiber on the first layer of adhesive, wherein the optical fiber includes a first end that extends at least to the first edge and a second end that extends at least to the second edge; and coupling a component to the optical fiber such that the component is in direct contact with the flexible substrate,
wherein the component is coupled to the optical fiber between the first and second ends of the optical fiber, and
wherein the component is configured to affect an optical signal propagating on the optical fiber.

26. The method of claim 25 further comprising:
applying a second layer of adhesive to the optical fiber and the component; and
positioning a laminate on the second layer of adhesive.

27. The method of claim 25, wherein coupling the component comprises coupling an active component.

28. The method of claim 25, wherein coupling the component comprises coupling a passive component.

29. The method of claim 25, wherein positioning the optical fiber comprises positioning a plurality of optical fibers on the first layer of adhesive.

30. The method of claim 25 further comprising providing excess optical fiber at the first or second edges of the flexible substrate.

31. The method of claim 30, wherein the excess optical fiber is arranged in a pigtail formation.

32. A flexible optical circuit comprising:
a flexible substrate having a side that defines an opening;
a component disposed in the opening;
a first optical fiber connected to the component; and
a second optical fiber connected to the component,
wherein the component is configured to affect an optical signal propagating on the first and second optical fibers;
wherein the flexible substrate further defines a first edge and a second edge, wherein the first optical fiber includes a first end that extends at least to the first edge, and wherein the second optical fiber includes a second end that extends at least to the second edge;
wherein the opening enables the first and second optical fibers to maintain their respective bend radius.

33. The flexible optical circuit of claim 32, wherein the component includes a protrusion that contacts the flexible substrate.

34. The flexible optical circuit of claim 32 further comprising a laminate disposed over the component, the first and second optical fibers, and the flexible substrate.

35. The flexible optical circuit of claim 32, wherein the component is secured to the flexible substrate by adhesive tape.

36. The flexible optical circuit of claim 35, wherein the component is connected to a back plane.

37. The flexible optical circuit of claim 36, wherein the back plane serves as a heat sink for the component.

38. The flexible optical circuit of claim 35, wherein the component includes a passive component.

39. The flexible optical circuit of claim 35, wherein the component includes an active component.

40. A flexible optical circuit comprising:
a flexible substrate;
a first layer of adhesive applied to the flexible substrate;
a first optical fiber and a second optical fiber positioned on the first layer of adhesive, wherein the first and second optical fibers each extend to at least one edge of the flexible substrate; and
a component coupled to the first and second optical fibers,
wherein the component is coupled between a first end of the first optical fiber and a second end of the second optical fiber, and
wherein the first component is configured to affect an optical signal propagating on the first and second optical fibers.

41. The flexible optical circuit of claim 40 further comprising a second layer of adhesive applied on the first and second optical fibers and the component.

42. The flexible optical circuit of claim 41 further comprising a laminate applied to the second layer of adhesive.

43. The flexible optical circuit of claim 40, wherein the component is one of an active component or a passive component.

44. The flexible optical circuit of claim 40, wherein the flexible substrate defines an opening, and wherein the opening is defined on a side of the flexible substrate.

45. The flexible optical circuit of claim 44, wherein the component is disposed in the opening.

46. The flexible optical substrate of claim 45, wherein the component protrudes from the side of the flexible substrate.

* * * * *